UNITED STATES PATENT OFFICE.

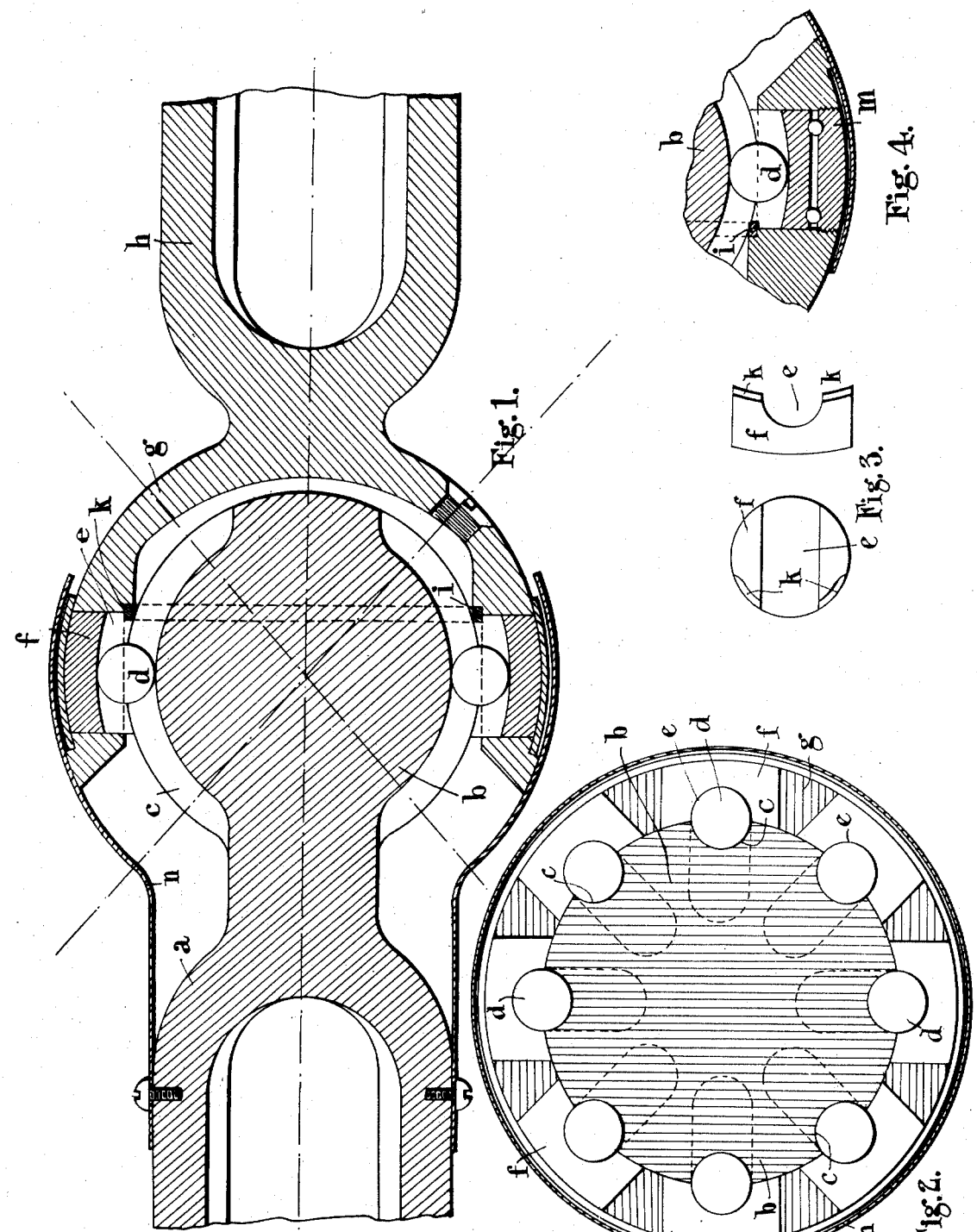

GEORGE FREDERICK WEST, OF PLAISTOW, LONDON, ENGLAND.

BALL-AND-SOCKET FLEXIBLE JOINT.

No. 927,391.  Specification of Letters Patent.  Patented July 6, 1909.

Application filed February 10, 1908. Serial No. 415,152. (Model.)

*To all whom it may concern:*

Be it known that I, GEORGE FREDERICK WEST, a subject of the King of Great Britain and Ireland, and residing at 118 Broadway, Plaistow, London, E., England, have invented certain new and useful Improvements in and Connected with Ball-and-Socket Flexible Joints, of which the following is a specification.

This invention relates to ball and socket flexible joints of the type wherein both the spherical end of one shaft or member and the socket end of the other shaft or member are provided with grooves or recesses adapted to receive balls or key pieces.

It has hitherto been proposed to provide the socket end with two recesses wherein loose bearing pieces adjustable by screws are mounted and retained in position against the ball by means of a retaining flange.

The object of the invention is to provide an improved joint which works more smoothly than was hitherto the case with joints of the type above described the joint being applicable for general purposes.

According to the present invention the socket end is provided with a number of recesses in each of which a grooved oscillatory carrier is freely mounted and receives a ball or key piece.

In the accompanying drawings, Figure 1 is a longitudinal section, and Fig. 2 a transverse section. Fig. 3 illustrates in plan and in two side views one of the cylindrical blocks or rockers employed. Fig. 4 illustrates a modification.

In carrying out the invention according to one mode, a shaft, $a$, is formed with a spherical end, $b$, which is provided with a number of meridional grooves, $c$, in which balls, $d$, engage, the balls engaging in grooves, $e$, in oscillatory carriers, $f$. The latter are mounted in corresponding recesses in the socket end, $g$, of the other shaft or member, $h$, the socket end being preferably hollowed out to correspond to the spherical end, $b$, of the shaft, $a$. The carriers, $f$, may, in joints of large size, be fitted with liners or with ball bearings, for instance as shown in Fig. 4, in which case the rear of the carriers and the removable screw plugs, $m$, are arranged with races for the balls.

The carriers, $f$, are preferably provided with notches, $k$, in which a ring, $i$, enters which limits the angle of oscillation of the carriers in order to prevent the carriers moving into positions wherein the grooves $e$ would be at right angles to the meridian grooves $c$, in which case freedom of the balls to roll in the grooves $e$ would be avoided.

In use either shaft may be the driving shaft, and the shafts may be arranged at any angle to one another within the limits indicated by the dotted lines in Fig. 1, effecting a drive in any position and in any plane within this range. When the shafts, $a$ and $h$, are moved relatively to each other, the cylindrical carriers, $f$, move more or less within their recesses, so as to allow for the angular movement. An outer guard, $n$, is fitted to keep out dust.

Instead of employing balls, small sliding pieces may be used.

The invention is applicable for general purposes. It may be used upon the propeller shaft of a motor-propelled vehicle, or with machine or hand tools, such, for instance, as a brace adapted to bore holes in any position that may not be convenient with a usual form of tool, and it is to be understood that any number of joints of the nature described may be combined in a series of short shafts, so as to form a continuous length of flexible shafting when desired.

In the operation of the device, supposing that the member $b$ is turned on the balls at the right and left of Fig. 2, the balls immediately above and below the balls at the right and left of said figure will move in the grooves of the member $b$. Of course, if the carriers $f$ had no rotary motion, and were fixed in the member $g$, then the balls could not move in the inclined grooves of the member $b$, but the carriers are adapted to have rotary movement in sockets, and they are grooved so that these grooves may conform, in position, with the angular grooves in the member $b$, and thus the balls referred to are free to move in the angular grooves.

Having thus described my invention what I claim as new and desire to secure by Letters Patent is:—

1. A universal joint comprising a cup shaped member, a spherical member located within the cup shaped member, said spherical member having meridional grooves, and the cup-shaped member having apertures, oscillatory carriers freely mounted in the apertures in the cup-shaped member and having grooves, and balls partly situated in said grooves and in the meridional grooves in the spherical member and means for limiting the degree of oscillation of the carriers.

2. A universal joint comprising a cup-shaped member, a grooved spherical member located within the cup-shaped member and having apertures, oscillatory carriers freely mounted in the said apertures of the cup-shaped member and having transverse grooves, balls located partly in said grooves and partly in the meridional grooves in the spherical member, said carriers having notches and a ring entering the notches of the carriers for limiting the angular oscillation of the same, substantially as described.

3. A universal joint comprising a spherical member having grooves, a cup-shaped member having apertures, carriers freely mounted in the apertures of the cup-shaped member, means for limiting the degree of oscillation of said carriers, said carriers having transverse grooves, balls situated partly in said grooves of the carriers and partly in said meridional grooves, screwed plugs at the rear of said carriers and ball bearings between the plugs and carriers.

In testimony whereof, I affix my signature in presence of two witnesses.

GEORGE FREDERICK WEST.

Witnesses:
ALFRED NUTTING,
BERTRAM H. MATTHEWS.